United States Patent Office 2,713,928
Patented July 26, 1955

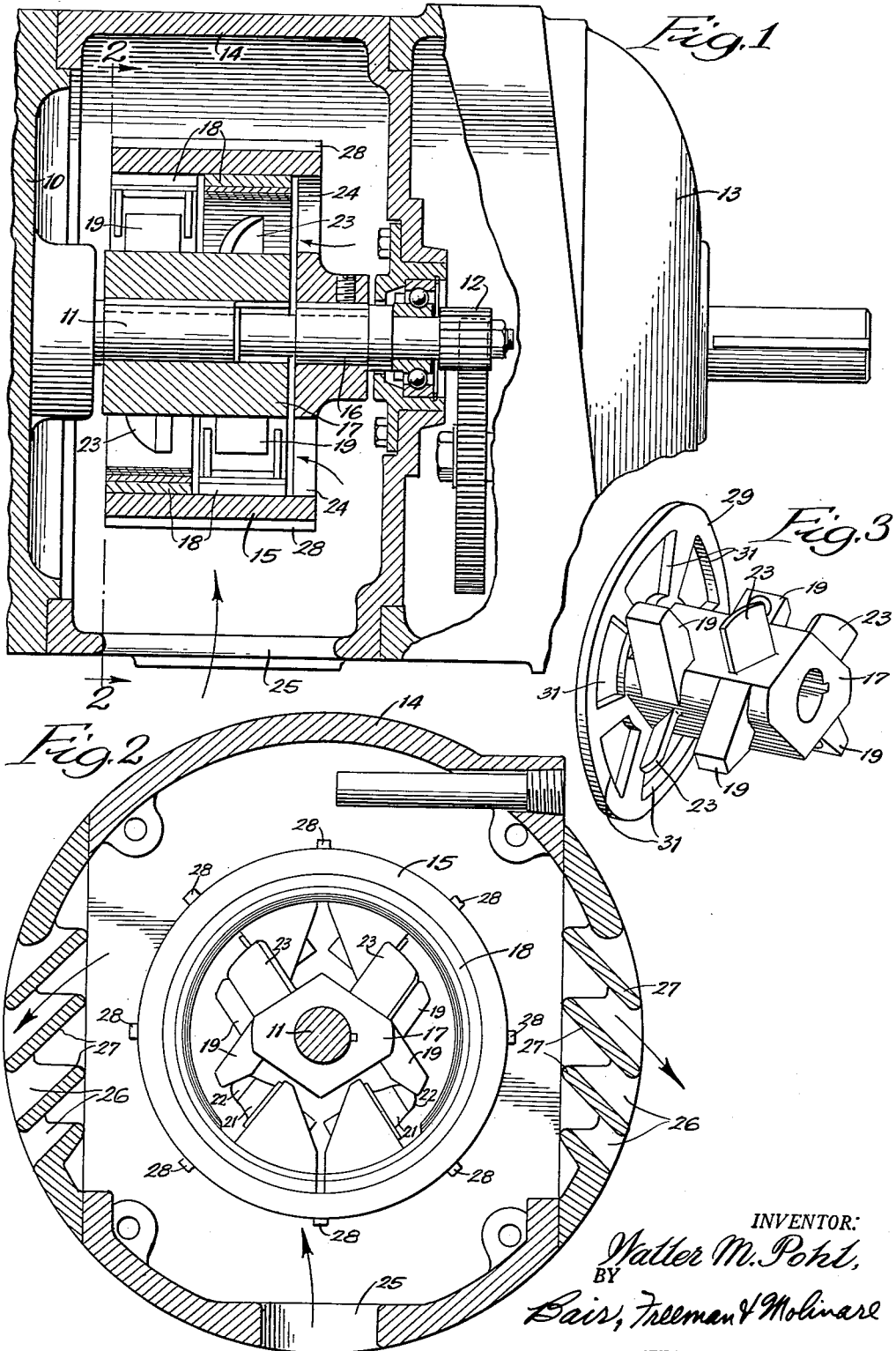

2,713,928

AIR COOLED CENTRIFUGAL CLUTCH

Walter M. Pohl, Chicago, Ill., assignor to Foote Bros. Gear & Machine Corp., Chicago, Ill., a corporation of Delaware Application October 10, 1952, Serial No. 314,031

7 Claims. (Cl. 192—113)

This invention relates to torque transmitting couplings and more particularly to the balancing and cooling of friction type couplings.

In couplings of the type employing a friction band movable into engagement with a drum in response to centrifugal force and driven through connection to one end thereof to a projection on a hub, it has been attempted to balance the coupling by using two axial spaced bands and spacing the driving projections therefor on opposite sides of the hub. This design produces static balance but leaves the unit dynamically unbalanced. Such couplings further tend to heat, especially during periods of slip, and are not adequately cooled by circulation of air over the exterior surface of the drum.

It is one of the objects of the present invention to provide a friction type coupling which is balanced both statically and dynamically and which is cooled by circulation of air therethrough.

According to one feature the hub is provided with blades opposite to the driving projections to balance the projections and at the same time to circulate air axially through the drum.

A further object is to provide a coupling which is enclosed in a housing and in which rotation of the coupling in the housing serves to circulate air through the coupling drum and through the housing.

The above and other objects and features of the invention will be more readily apparent from the following description when read in connection with the accompanying drawing, in which:

Figure 1 is a longitudinal section with parts in elevation of a unitary motor coupling and reducer assembly embodying the invention;

Figure 2 is a transverse section on the line 2—2 of Figure 1, and

Figure 3 is a perspective view of the coupling hub showing a modified end closure.

The combined unit of Figure 1 includes an electric motor 10 having a driving shaft 11 which is adapted to be connected through the coupling of the invention to the input gear 12 of a gear reducer 13. The coupling is enclosed in a cylindrical housing 14 shaped to fit at one end against the housing of the motor 10 and at its opposite end against the gear reducer housing and to be secured thereto in a unitary assembly. The coupling, itself, comprises a cylindrical drum 15 connected to a shaft 16 which carries the driving gear 12. A hub 17 is connected to the motor drive shaft 11 and lies coaxial within the drum 15. Friction bands 18 lie within the drum around the hub 17 and carry coupling units on their ends adapted to engage the projections 19 on the hub.

The coupling units as shown at 21 in Figure 2, may be annular elastic devices carrying pins having spherical heads 22 to engage spherical sockets in the faces of the projections 19 although any other desired type of connection between the bands and hub could be employed.

The coupling as shown, is adapted to drive in either direction and the projections 19 therefor are arranged in pairs in axial alignment with the friction bands 18 respectively and spaced less than 180° apart on the hub. Therefore, while the projections of the different pairs can be turned through 180° relative to each other as shown in Figure 3 to produce a condition of static balance, the unit will be dynamically unbalanced due to axial displacement of the pairs of projections relative to each other.

According to the present invention, this unbalance is overcome by counter-balancing the hub diametrically opposite to the projections. At the same time cooling of the unit is achieved by making the counter-balance elements in the form of blades 23 which lie diametrically opposite to the projections respectively, and which are given an axial pitch at an angle to the hub axis to circulate air axially. As shown, one blade 23 lies diametrically opposite to each of the projections although it will be apparent that the separate blades can be combined into single blades counter-balancing the pairs of projections.

To provide for circulation of air through the drum one end thereof is left open as shown in Figures 1 and 2, and the opposite end is formed with a web through which it is connected with the shaft 16 and which is provided with ventilating openings 24. Therefore, when the hub is rotating, either during stall of the drum or when the drum is turning with the hub, the blades 23 will produce an axial circulation of air through the drum to cool the unit. It is noted that the air so circulated will flow in intimate contact with the friction bands and to some extent with the inner surface of the drum so that the cooling will be very effective since the heat is dissipated substantially at the point of generation thereof.

To provide for circulation of cooling air through the housing 14 an air inlet opening 25 is formed in the bottom of the housing and a pair of air inlet openings 26 are provided in the opposite sides of the housing as shown in Figure 2.

Guide vanes or louvers 27 are arranged in each of the discharge openings and lie in planes tangent to circles inscribed within the housing and with opposite directions of pitch. Therefore when the drum is turning clockwise as seen in Figure 2, air tends to discharge through the opening at the right of the housing due to the fact that it will be scooped up and carried out of the housing by the guide vanes 27 at their side. Some air may be drawn into the outlet opening at the left during this operation and air will also be drawn into the inlet opening 25 to replace the air ejected from the housing. When the drum is turning in the opposite direction air will be ejected through the outlet opening at the left side of the housing and will be drawn in through the inlet opening and through the outlet opening at the right side of the housing.

To facilitate circulation of air around in the housing axially extending ribs or vanes 28 may be formed on the exterior of the drum. In this way, fresh cool air is always supplied to the housing to be circulated through the drum and the housing, itself, to maintain the unit cool under all normal operating conditions.

When the unit is not to be enclosed within a housing as shown in Figures 1 and 2, the hub preferably carries a closure disc 29 as shown in Figure 3 of a size to fit closely against the open end of the drum to provide a complete self-contained unit. The closure disc 29 is preferably cut out as indicated at 31 to form air circulating openings so that air can flow axially through the coupling to cool it. This construction would be employed where the coupling is installed on open shafting for example, without a stationary separate housing such as 14 in closing it. Other than the addition of the closure disc 29, couplings for both types of installation are identical.

While one embodiment of the invention has been shown and described in detail, it will be understood that this is illustrative only and is not to be taken as the scope of the invention, reference being had for this purpose to the appended claims.

What is claimed is:

1. A torque transmitting coupling comprising a cylindrical drum open at its ends for flow of air therethrough, a hub in the drum, a friction band in the drum around the hub adapted to engage the drum in response to centrifugal force, a radially extending projection on the hub, means connecting the projection to one end of the band to turn the band with the hub as the hub turns, and a blade on the hub diametrically opposite to the projection and lying in a plane at an acute angle to the hub axis to counter-balance the projection and to force air through the drum as the hub turns.

2. A torque transmitting coupling comprising a cylindrical drum open at its ends for flow of air therethrough, a hub in the drum, a friction band in the drum around the hub adapted to engage the drum in response to centrifugal force, a pair of circumferentially spaced projections on the hub, means connecting the projections to the ends of the band respectively to turn the band with the hub, and blade means on the hub diametrically opposite to the projections and pitched at an acute angle to the hub axis to counter-balance the projections and to force air through the drum as the hub turns.

3. A torque transmitting coupling comprising a cylindrical drum open at its ends for flow of air therethrough, a hub in the drum, a pair of axially spaced friction bands around the hub to engage the drum in response to centrifugal force, axially and circumferentially spaced driving projections on the hub, means connecting the driving projections to the ends of the bands respectively to turn the bands with the hub, and a plurality of blades on the hub diametrically opposite to and in the same axial plane as the projections respectively to counter-balance the projection and to circulate air through the drum.

4. A torque transmitting coupling comprising a hollow housing formed at one point in its periphery with an air inlet opening and at a second point in its periphery with an air outlet opening, guide vanes in the outlet opening extending substantially tangent to circles inscribed within the housing, a cylindrical drum in the housing open at its ends for flow of air therethrough, a hub rotatable in the drum, clutch parts in the drum connected to the hub to connect the hub and drum, and blades on the hub pitched at an angle to its axis to circulate air axially through the drum.

5. The construction of claim 4 in which the drum has axially extending blades on its periphery to effect a rotating air circulation in the housing.

6. A torque transmitting coupling comprising a hollow housing formed at one point in its periphery with an air inlet opening and at a second point in its periphery with an air outlet opening, guide vanes in the outlet opening extending substantially tangent to circles inscribed within the housing, a cylindrical drum in the housing open at its ends for flow of air therethrough, a hub rotatable in the drum, a friction band in the drum around the hub, a radial projection on the hub, means to connect the radial projection to one end of the band, and a blade on the hub diametrically opposite to the projection and pitched at an angle to the hub axis to counter-balance the projection and to circulate air axially through the drum.

7. A torque transmitting coupling comprising a hollow housing formed in its bottom with an air inlet opening and in its opposite sides with air outlet openings, guide vanes in the outlet openings lying substantially tangent to circles inscribed within the housing, the guide vanes in the respective openings being pitched in opposite directions, a cylindrical drum in the housing open at its ends for flow of air therethrough, a hub rotatable in the drum, clutch parts in the drum connected to the hub to connect the hub and drum in either direction of rotation thereof, and blades on the hub pitched at an angle to its axis to circulate air axially through the drum.

References Cited in the file of this patent

UNITED STATES PATENTS

| 1,644,759 | Taub | Oct. 11, 1927 |
| 1,743,753 | Bryson | Jan. 14, 1930 |
| 1,823,912 | Nieman et al. | Sept. 22, 1931 |
| 1,866,291 | Bryson | July 5, 1932 |
| 2,340,415 | Eason | Feb. 1, 1944 |

FOREIGN PATENTS

| 572,771 | France | Feb. 28, 1924 |